United States Patent Office 2,888,492
Patented May 26, 1959

2,888,492
PRODUCTION OF POLYOLS

Rudolph F. Fischer, Oakland, and Curtis W. Smith, Berkeley, Calif., assignors to Shell Development Company, New York, N.Y., a corporation of Delaware No Drawing. Application August 8, 1955
Serial No. 527,156

9 Claims. (Cl. 260—635)

This invention relates to the manufacture of polyhydroxy alcohols from hydroxy acetals. It deals with a novel process whereby acetals of hydroxy aldehydes can be reacted to produce polyols having the same structure as said hydroxy aldehydes except for the presence of a carbinol group in place of the carbonyl group. New and more efficient methods for producing cyclic acetals which are advantageous starting materials for the production of these polyols are another important feature of the invention.

Cyclic acetals have been used as sources of polyols in the past. The methods which have been employed have been satisfactory for the regeneration of the polyol corresponding to the starting cyclic acetal particularly the diols from which the cyclic acetals were derived. They have not been suitable for the production of polyols having a structure corresponding to that of the aldehyde component of the acetal as above indicated. Thus, for example, Groll patent—U.S. 2,122,813 describes and claims the hydrolysis of cyclic acetals to produce the polyol and aldehyde corresponding to the acetal used in the reaction. Reduction of cyclic acetals has also been carried out. Hearne patent—U.S. 2,486,024 points out that the products to be expected in such reductions are either hydroxy ethers or compounds containing the dioxolane ring of the starting cyclic acetal. Hydrogenation of a hemiacetal to produce hydroxy products has been described in French Patent 1,030,806 but this method cannot be used to obtain such products from the full acetals of hydroxy aldehydes with which the present invention is concerned.

The invention is based upon the discovery that by proper control of the reaction conditions fission of the carbon-to-oxygen bonds of acetals can be effected with simultaneous conversion of each of the three carbon atoms involved in these linkages to a carbinol group. The acetals here referred to are full acetals, i.e. have only hydrogen and/or saturated carbon atoms linked to the three carbon atoms attached to the two acetal oxygen atoms, that is, to the free bonds of the

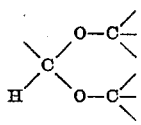

group. They are thus distinguished from hemiacetals which are characterized by the presence of a

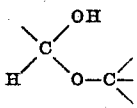

group.

In accordance with the invention a polyol corresponding to a hydroxy aldehyde in which the carbonyl group has been replaced by a carbinol group is produced by subjecting an acetal of said hydroxy aldehyde to the simultaneous action of an aqueous acidic hydrolytic medium containing at least an equimolecular amount of water and a superatmospheric pressure of hydrogen in the presence of a hydrogenation catalyst. In addition to the polyol corresponding to the hydroxy aldehyde there is also obtained the alcohol or polyol from which the acetal was derived.

As previously pointed out, the invention is also characterized by a new method for producing cyclic acetals which are useful starting materials for the above-described new reaction. This new synthesis of cyclic acetals has special advantages over other methods of cyclic acetal production in a novel combination of cooperating steps whereby unsaturated aldehydes or hydroxy aldehydes can be converted to polyols in accordance with the present invention.

Whether one uses an ethylenic aldehyde or a hydroxy aldehyde as the starting compound, the first step of the process is formation of the corresponding acetal. There are special advantages, as will be pointed out more fully hereinafter, in the use of a polyol in this step of the process to form a cyclic acetal. It is feasible, however, to employ monohydric alcohols in this step of the process although when using ethylenic aldehydes as starting materials this will usually result in some sacrifice of plant capacity.

Where hydroxy aldehydes are available as starting materials from an outside source the acetal obtained therefrom in the first step of the combination process can be fed directly to the new hydrolysis-hydrogenation reaction of the invention. The process of the invention according to this modification is illustrated by the following equations showing the reaction of 3-hydroxybutyraldehyde with trimethylene glycol and conversion of the resulting cyclic aldehyde to the starting trimethylene glycol which is recycled and product 1,3-butanediol:

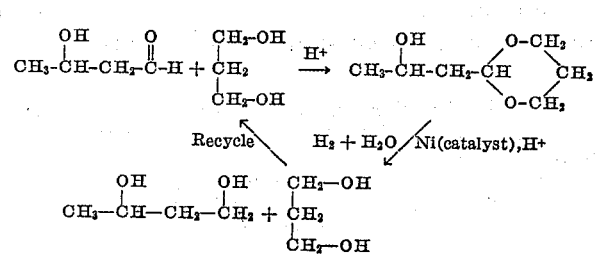

The intermediate 2-(2-hydroxypropyl)-1,3-dioxane need not be isolated from the reaction mixture in which it is prepared before carrying out the final combined hydrogenation and hydrolysis according to the invention.

The process as carried out with unsaturated aldehydes as starting materials can be conducted in different ways depending upon the type of polyol product which it is desired to obtain. For the conversion of the starting unsaturated aldehyde or ketone to the corresponding diol, it has been found advantageous to carry out the acetal-forming step in the presence of at least one mole of hydrogen halide, preferably hydrogen chloride or bromide, per mole of ethylenic aldehyde used. This method of operation results in the formation of a halo-substituted acetal which can then be hydrolyzed by reaction with an aqueous basic agent to form the corresponding acetal of a hydroxy aldehyde which is then fed to the hydrogenolysis stage of the reaction previously described. This modification of the invention is illustrated by the following equations showing the production of 1,3-dihydroxy-2- ethylpropane from alpha-ethyl acrolein using 1,3-butanediol as the diol for acetal formation:

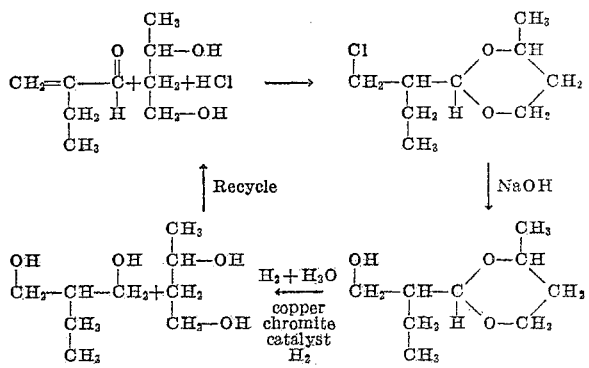

In this method of operation the hydrogen chloride used for addition at the double bond of the ethylenic aldehyde also functions as the acid catalyst. As before, the starting diol is separated from the product polyol and recycled to the first step.

For the production of triols from an ethylenic aldehyde, the first step of the process is carried out with only a small amount of acid catalyst under controlled conditions to form the corresponding ethylenic acetal which is then converted in the hydroxy acetal formation step to the dihydroxy acetal by reaction with a hydroxylating agent. The following equations illustrate this modification of the combination process as carried out for the production of alpha-methyl glycerol from crotonaldehyde using methanol for forming the intermediate acetal, 1,1-dimethoxybutene-2, and reaction with hydrogen peroxide in the presence of sodium tungstate catalyst for the hydroxylation step;

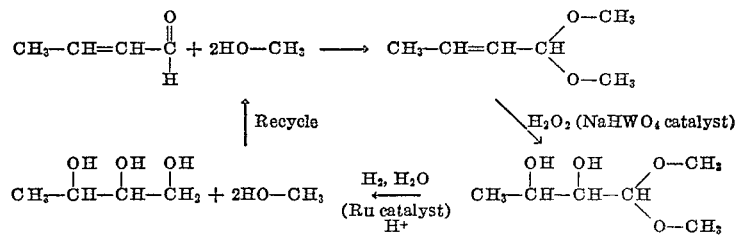

Conventional methods can be used for carrying out the first step of acetal formation in the new combination process. Thus the method of Myers patent—U.S. 2,678,-950 can be employed not only for the preparation of unsaturated acetals from acrolein and monohydric alcohols as therein described but also in the production of the corresponding acetals of other ethylenic aldehydes and monohydric alcohols. German Patent 434,989 describes a method for producing cyclic unsaturated acetals from unsaturated aldehydes and glycols which can be used in the present combination process. However, we have found a new and more advantageous method for carrying out this step of the process. According to this feature of the invention, cyclic acetals of alpha,beta-ethylenic aldehydes are produced by reacting the aldehyde with a polyol having at least two carbinol groups separated by not more than one carbon atom, hereinafter referred to as apha,beta- and alpha,gamma-polyols even though the alpha-hydroxy radical thus indicated need not be on a terminal carbon atom, in the presence of 0.02 to 0.06 mole percent based on the amount of ethylenic aldehyde present of a sulfo acid such as sulfuric acid, p-toluene sulfonic acid, ethanesulfonic acid, and the like. The reaction can be carried out conveniently by heating a mixture of the chosen alpha,beta-ethylenic aldehyde and polyol, preferably containing about 5 to 50% excess of aldehyde over the stoichiometric requirement for the reaction, dissolved, or suspended in a suitable liquid such, for instance, as benzene, dichloroethylene, etc. By refluxing at about 50° to 90° C. under a phase-separating head until the theoretical amount of water is removed, the reaction is completed in about 1 to 3 hours and high yields of unsaturated cyclic acetals are obtained.

It is important in this new method of producing cyclic unsaturated acetals to use sulfo acid catalysts in the indicated proportions. When less than 0.02 mole percent of catalyst based upon the starting alpha,beta-ethylenic aldehyde is used the reaction time must be prolonged and plant capacity is correspondingly reduced with consequent increased operating cost. If more than 0.06 mole percent catalyst is used the yield of unsaturated acetal is reduced as a result of addition of hydroxyl to the ethylenic double bond.

Most advantageously an alpha,beta- and/or alpha,gamma-polyol having at least one tertiary carbinol group separated by not more than one carbon atom from a secondary or tertiary carbinol group, is used in preparing the cyclic acetal. By the use of this special type of highly substituted polyol it has been unexpectedly found that, in contrast to other polyols and all monohydric alcohols, the reaction with aldehydes goes to completion in the presence of large amounts of water. This makes it possible to employ dilute aqueous solutions of unsaturated and/or hydroxy aldehydes in the first step of the combination process with considerable saving in operating expense. Thus by simply adding a highly substituted glycol such, for example, as 2-methyl-2,3-butanediol, 2,4-dimethyl-2,4-pentanediol, or the like, together with the acid catalyst to an aqueous solution of an aldehyde and heating at about 50°–90° C. one can obtain high yields of acetal without having to distill large amounts of water. This is of special advantage in the treatment of aldehydes which tend to decompose and/or polymerize or condense during recovery from water. Thus it is particularly useful in preparing cyclic acetals of the unstable alpha- or beta-hydroxy aldehydes or of highly polymerizable alpha-methylidene alkanals.

This feature of the invention is not only useful in preparing cyclic acetals for the novel combined hydrogenation-hydrolysis reaction of our invention but also can be advantageously carried out for other purposes. For instance, it has been found to be highly useful for the removal of water soluble aldehydes from aqueous solutions and has been successfully used for removing aldehydic impurities from other compounds. The purification of fermentation glycerol by thus removing aldehydic impurities is a typical example of this application of the new cyclic acetal formation method. By use of this new method formaldehyde can be economically recovered from aqueous solution as dilute as about 2% or less by adding a ditertiary or tertiary-secondary diol, acidifying, maintaining the mixture at about 50° to 90° C. for about one to about ten hours and separating the resulting cyclic acetal of formaldehyde. In this way substantially complete recovery of the formaldehyde can be achieved without the expensive distillation of large amounts of water as is necessary in the usual methods of recovery. In the same way hydracrylaldehyde and alpha-hydroxy adipaldehyde which are so highly unstable that they cannot be successfully recovered in any other way, can be obtained as stable cyclic acetals useful as such or for further reaction.

As previously indicated, when using an unsaturated aldehyde as the starting material for the preparation of the corresponding diol it is often convenient to carry out the acetal forming step in the presence of sufficient hydrogen halide to form the acetal of the corresponding hydrochlorinated aldehyde instead of the unsaturated acetal. The reaction is advantageously carried out with about equimolar quantities of unsaturated aldehyde and polyol, although an excess of either reactant, more preferably the polyol, can be used with an equivalent amount or a slight excess not greater than 10% of hydrogen halide such as hydrogen chloride or bromide. The reaction can be conveniently carried out by bubbling dry hydrogen chloride gas through a stirred solution of the ethylenic aldehyde and polyol in a water-insoluble solvent at about −25° to +25° C. The highly substituted diols previously referred to offer advantage over other polyols in this method of carrying out the first step of the process also but it is feasible to use other polyols although the yields obtainable are generally somewhat lower under the same conditions. The products, which will be 2-(chloroalkyl)-1,3-dioxolanes or 2-(chloroalkyl)-1,4-dioxanes in the case of the reaction of ethylenic aliphatic aldehydes with alpha,beta- or alpha,gamma-diols respectively, can be recovered by removing the aqueous phase of the mixture after absorption of hydrogen chloride ceases, neutralizing and distilling off the solvent.

Corresponding chlorohydrination products can be obtained by similar reaction in an aqueous medium using hypochlorous acid instead of hydrogen chloride when a highly substituted diol of the previously indicated type is used for the cyclic acetal formation. This method of operation is illustrated by the following equation for the reaction of acrolein with 2-methyl-2,4-hexanediol:

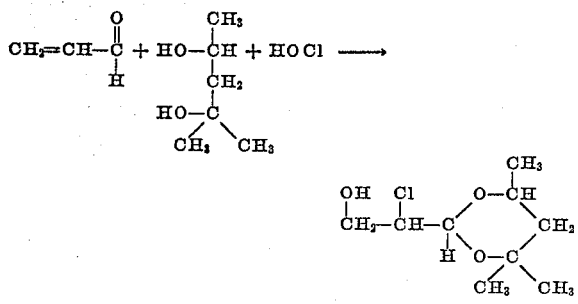

A smaller amount of the isomeric product 2-methyl-2-(2-chloro-1-hydroxyethyl)-4,4,6-trimethyl-1,3-dioxane

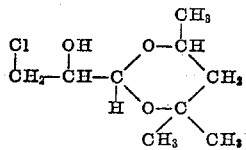

is also produced.

While there is considerable saving in operating expense by thus converting unsaturated aldehydes to the halo- or halohydrin-substituted acetals in a single step, the same products can also be made by first preparing the ethylenic cyclic acetals and separately reacting these with conventional halogenation, hydrohalogenation or halohydrination agents, for instance, chlorine, hydrogen chloride or sodium hypochlorite.

The halogen-containing cyclic acetals thus produced are converted to the corresponding hydroxy compounds in the second step of one modification of the new combination process by reaction with a basic agent, for instance sodium hydroxide or lime. This hydrolysis is conveniently conducted in an aqueous medium maintained at a pH of about 7.5 to 10 at a temperature of about 150° to 200° C. The product can be recovered by extraction with a suitable water-immiscible solvent such as ether but this is not necessary since the crude reaction mixture has been found to be a satisfactory feed stock for the final reaction step of the new combination process, it being only necessary to add sufficient acid in this final step to neutralize any residual alkalinity of the hydrolyzed mixture.

Other methods of producing acetals of hydroxy aldehydes for use as starting materials for the hydrogenolysis reaction of the invention can be employed. Especially suitable, as has been hereinbefore pointed out, is hydroxylation of the unsaturated acetals from ethylenic aldehydes. Bergsteinsson patents—U.S. 2,373,942 and 2,500,599 describe hydroxylation methods which are useful for this purpose. Alternatively one can employ hydrolysis, under basic conditions, of esters, particularly carboxylic acid esters, of acetals of hydroxy aldehydes as the source of the starting material for simultaneous hydrolysis and hydrogenation according to the invention.

The final step of the combination process broadly comprises hydrolyzing the acetal of the hydroxy aldehyde in the presence of a hydrogenation catalyst and of hydrogen under conditions which favor hydrogenation reaction. In this step the alcohol (which may be either a monohydric or a polyhydric alcohol) from which the acetal was derived is regenerated and a polyol corresponding to said hydroxy aldehyde except for the presence of a carbinol group in place of the carbonyl group is produced. This reaction is most efficiently carried out by hydrogenating the chosen acetal in the presence of an aqueous acid medium and a hydrogenation catalyst at elevated temperature under a superatmospheric pressure of hydrogen.

By proper choice of aqueous acid medium for the reaction any of the metal or metal compound catalysts of the type well known and customarily referred to in the art as hydrogenation catalysts can be used. It is desirable to employ as the hydrogenation catalyst a metal or a compound of a metal which may be easily and economically prepared, which has a high degree of activity, and which retains its activity under the conditions of the process for a length of time sufficient to avoid the necessity of reactivating or replacing the catalyst at too frequent intervals. Generally speaking, hydrogenation catalysts which may be employed in the execution of the process of the invention include the metal hydrogenation catalysts, such as platinum, palladium, gold, silver, copper, vanadium, tungsten, cobalt, nickel, ruthenium, rhodium, manganese, chromium, molybdenum, iridium, titanium, zirconium, and the like and mixtures of the same and compounds and alloys thereof, particularly oxides and sulfides thereof, and like hydrogenation catalysts. Because of the ease and economy with which they may be prepared, the base metal hydrogenation catalysts, particularly the pyrophoric base metal hydrogenation catalysts such as nickel, cobalt, and iron, are advantageous. Because of their inertness to acids and particular efficacy when employed in the process of the invention, the metal hydrogenation catalysts such as palladium, rhenium, titanium and the like are particularly advantageous. The hydrogenation catalyst may be employed in a finely divided form and dispersed in and throughout the reaction mixture, or it may be employed in a more massive state, either in essentially the pure state or supported upon or carried by an inert or catalytically active supporting or carrier material, such as pumice, kieselguhr, diatomaceous earth, clay, alumina, charcoal, carbon, or the like, and the reaction mixture contacted therewith as by flowing the mixture over or through a bed of the catalyst or according to other methods that are known in the art.

A wide variety of acid-reacting materials can be used for imparting the required acidity to the aqueous reaction medium. Acids and acid-reacting salts have both been successfully used. The acid-reacting material must, however, be one which does not adversely affect the hydrogen catalyst, that is, it must be nonpoisonous to the catalyst chosen. Depending on the catalyst which is used one can employ mineral acids such as sulfuric, hydrochloric, phosphoric, nitric, and like acids or such acid acting salts as sodium bisulfate, monosodium orthophosphate, zinc chloride, ferric chloride, aluminum sulfate, etc. Because of their lesser tendency to poison the base metal hydrogenation catalysts, water-soluble organic carboxylic acids are especially advantageous acidifying agents for use in the process. Particularly useful are the lower fatty acids of 1 to 4 carbon atoms, especially acetic, propionic, isobutyric and normal butyric acids but polycarboxylic acids such as succinic, malonic and adipic acids are also suitable. These organic acids are useful in amounts of about 5% to 100% by weight of the water used in the reaction. Because of the danger that excessive amounts of the stronger inorganic acids and acid-acting salts may adversely affect the activity of the hydrogenation catalyst it is desirable to apply them as solutions of from about 0.005 to about 1 normal concentration.

At least one mole of water per mole of acetal should be present in the reaction mixture and it has been found to be more advantageous to employ amounts greater than 1.5 moles per mole of acetal. In order to avoid excessive dilution of the reaction mixture which makes it more difficult to obtain effective contact of the acetal with the catalyst without resorting to the use of unnecessarily large amounts of hydrogenation catalyst, it is desirable to use not more than 100 moles of water per mole of hydroxy acetal.

The reaction can be conducted at temperatures in the range of about 50° C. to about 300° C., the temperature in this range which is most suitable will depend upon the activity of the hydrogenation catalyst being employed as well as, to a somewhat lesser extent usually, on the particular acetal being treated since it is always necessary to operate at temperatures below the pyrolysis point of the feed. As the catalyst loses activity through continued use in the process it is usually desirable to increase the temperature so as to maintain a practical throughput rate, but it is preferable as a rule not to exceed temperatures of about 150° C.

Hydrogen pressures greater than about 250 pounds per square inch are advantageous for accomplishing the objects of the invention. The maximum pressure of hydrogen that may be employed is determined largely by the strength of the equipment that is used and is not known to be critical. A convenient maximum pressure of hydrogen is 10,000 pounds per square inch, and a preferred range of hydrogen pressures is from about 1000 to about 5000 pounds per square inch.

The reaction can be conveniently carried out continuously by flowing a stream of aqueous acid and the hydroxy acetal under treatment over and/or through a fixed or moving bed of the hydrogenation catalyst together with hydrogen under pressure. Alternatively the process can be carried out in the same way with a suspension of finely divided catalyst in the reaction mixture which is fed at a rate sufficient to insure a turbulent flow which prevents settling out of catalyst.

At the conclusion of the hydrogenation treatment, the desired product therefore may be recovered directly from the reaction mixture in any suitable manner. For example, the hydrogenation catalyst, if dispersed in the reaction mixture, may be removed by filtration, centrifugation, or by other means which are suitable. The mixture is then neutralized in case a strong inorganic acid has been used in the process although this is neither necessary nor desirable when employing the preferred volatile organic acid acidifying agents. The latter can be distilled from the reaction mixture and reused in the process as can the mono- or poly-hydric alcohol recovered for recycling to the acetal formation step. The product polyol can then be further purified, if desired, by distillation, crystallization or otherwise, or can be used in impure form.

The following examples further illustrate specific embodiments of this invention.

EXAMPLE I.—CONVERSION OF ACROLEIN TO TRIMETHYLENE GLYCOL

A. *Production of the acetal*

Dry hydrogen chloride was bubbled with stirring into a solution of 236 grams (2.0 moles) of 2-methyl-2,4-pentanediol and 142 ml. (2.0 moles) of 96% acrolein in 350 ml. of chloroform at −15° C. to −10° C. When hydrogen chloride was no longer absorbed the aqueous layer which had formed was removed, the organic layer was washed with water and bicarbonate solution, dried, filtered, and stripped. Distillation of the residue from a Claisen flask gave 360 grams (94% yield) of product, B.P. 69–77° C. (5 mm.). A heart cut, B.P. 71° C. (5 mm.) gave analyses in agreement with 2-(2-chloroethyl)-4,4,6-trimethyl-1,3-dioxane.

B. *Production of hydroxy acetal*

A mixture of 112 grams (0.58 mole) of the beta-chloropropionaldehyde cyclic acetal, 2-(2-chloroethyl)-4,4,6-trimethyl-1,3-dioxane, produced as above, 300 ml. of water and 16 grams of sodium carbonate was charged to a stirred autoclave which was heated at 160° C. while 27.2% sodium hydroxide was pumped into the autoclave to maintain the pH at ca. 8–9. In six hours 61 ml. (94% of the theory) was consumed, after which no further reaction occurred. The cooled product was taken up in ether, dried, filtered, and stripped. Distillation of the residue from a Claisen flask gave 82 grams (82% yield) B.P. 82–92° C. (3 mm.). Redistillation through a two-foot packed column gave essentially complete recovery of hydracryl aldehyde-glycol acetal; B.P. 69° C. (1 mm.), $n\ 20/D\ 1.4485$.

*Analysis.*—Calculated for $C_9H_{18}O_3$: C, 62.1; H, 10.4; OH value, 0.58 eq./100 g. Found: C, 62.1; H, 10.4; OH value, 0.58 eq./100 g.

C. *Hydrolysis-hydrogenation reaction*

A solution of 55 grams (0.316 mole) of the hydracryl aldehyde-glycol acetal, 2-(2-hydroxyethyl)-4,4,6-trimethyl-1,3-dioxane, in 100 ml. of 20% aqueous acetic acid was hydrogenated at 100° C. and 1000 p.s.i.g. of hydrogen in a stainless steel autoclave using 5 grams of 10% palladium on charcoal as the hydrogenation catalyst. After filtration, the water and acetic acid were removed by vacuum distillation leaving 58 grams of residue. Mixed glycols in 86% (distilled) yield were obtained. Fractionation in a Piros-Glover spinning band column removed 2-methyl-2,4-pentanediol ($n\ 20/D\ 1.4272$–1.4274) at 114.5–130° C. (35 mm.), after which trimethylene glycol ($n\ 20/D\ 1.4388$–1.4408) was distilled off at 130° C. (35 mm.).

| Analysis for $C_3H_8O_2$ | C | H | OH Value |
|---|---|---|---|
| Found | 46.9 | 10.6 | 2.63 |
| Theory | 47.4 | 10.6 | 2.63 |

The 2-methyl-2,4-pentanediol is recycled to the acetal formation step, A.

Substituting 2,3-butanediol for the 2-methyl-2,4-pentanediol in the reaction with acrolein and dry hydrogen chloride, there is obtained 2-(2-chloroethyl)-4,5-dimethyl-1,3-dioxolane, B.P. 85° C. (20 mm.), $n\ 20/D\ 1.4419$, which on reaction with sodium carbonate and hydroxide as in Example IB gives a good yield of 2-(2-hydroxyethyl)-4,5-dimethyl-1,3-dioxolane. Simultaneous hydrolysis and hydrogenation of this hydracryl aldehyde cyclic acetal in aqueous acetic acid solution as in Example IC gives a similar good yield of the mixed glycols, trimethylene glycol and 2,3-butanediol.

Reacting acrolein, ethylene glycol and hydrogen bromide in the same way gives 2-(2-bromoethyl)-1,3-dioxolane in 71% yield which after hydrolysis under the conditions of Example IB and hydrogenation of the resulting 2-(2-hydroxyethyl)-1,3-dioxolane in aqueous acetic acid as in Example IC gives trimethylene glycol and ethylene glycol in good yields.

EXAMPLE II.—CONVERSION OF ACROLEIN TO GLYCEROL

A. Production of the acetal 2-methyl-2,4-pentanediol was thoroughly mixed with 10% excess of acrolein, one to three volumes of benzene and 0.026 mole of p-toluenesulfonic acid per mole of acrolein. The mixture was then refluxed vigorously under a phase-separating head for 2.5 hours at which time evolution of water had ceased. After the excess of acrolein and some benzene had been removed by atmospheric distillation through the head, the residue was cooled, and an excess of calcium oxide was stirred into the solution. After filtration the liquid was stripped and distilled at reduced pressure. The product, 2-vinyl-4,4,6-trimethyl-1,3-dioxane, B.P. 62–64° C. at 18 mm., $n$ 20/D 1.4381, was recovered in 98.5% yield and conversion based on the 2-methyl-2,4-pentanediol applied.

| Analysis | C | H | Bromine No. |
|---|---|---|---|
| Calculated | 69.3 | 10.2 | 102 eq./100 g. |
| Found | 69.1 | 10.3 | 100 eq./100 g. |

B. Production of hydroxy acetal

The unsaturated cyclic acetal, 2-vinyl-4,4,6-trimethyl-1,3-dioxane prepared as above, was hydroxylated by slowly adding hydrogen peroxide of 30.5% concentration to a vigorously stirred aqueous ethanol solution of the acetal at 25–30° C. over a period of about 1.25 hours, using 1% by weight of osmium tetroxide, based on the acetal, as catalyst. After completion of the hydrogen peroxide solution the mixture was stirred for an additional 2.5 hours at the same temperature after which the product was recovered by distillation after first taking off the water and ethanol. At a 1:1 mole ratio of hydrogen peroxide to unsaturated acetal the conversion of peroxide to 2-(2,3-dihydroxyethyl)-4,4,6-trimethyl-1,3-dioxane, B.P. 86–89° C. (0.2 mm.), $n$ 20/D 1.4621, was 88.5%.

C. Hydrolysis-hydrogenation reaction

A solution of the glycerol aldehyde-glycol acetal, prepared as above, in 20% aqueous acetic acid, was hydrogenated under the conditions of Example IC. Titration of the reaction mixture showed a 100% yield of glycerol based on starting acetal. After purification the glycerol has a boiling point of 170° C. at 12 mm., and a refractive index of $n$ 20/D 1.4729. A 94% recovery of 2-methyl-2,4-pentanediol for recycling to step A is obtained.

Similar reaction of acrolein with 1,2,6-hexanetriol instead of 2-methyl-2,4-pentanediol gives 2-vinyl-4-(omega-hydroxybutyl)-1,3-dioxolane. Hydroxylation of this product under the conditions of Example IIB gives 2-(2,3-dihydroxyethyl)-4-(omega-hydroxybutyl)-1,3-dioxolane which on hydrolysis and hydrogenation as in Example IIC results in a good yield of glycerol together with the starting 1,2,6-hexanetriol.

EXAMPLE III.—CONVERSION OF METHACROLEIN TO BETA-METHYLGLYCEROL

A. Production of the acetal

About the stoichiometric requirement of methacrolein for formation of the diethyl acetal, refluxed for 24 hours with petroleum ether under a phase separating head in the presence of 0.001 mole percent of p-toluenesulfonic acid based on the acrolein gives methacrolein diethyl acetal, B.P. 143°–148° C. in good yield. Chlorine gas was bubbled into a stirred solution of 60 grams (1.46 moles) of sodium hydroxide in 1800 ml. of water held at 0° C. to 5° C. until 103 grams (1.45 moles) was absorbed and 17 grams (0.2 mole) of sodium bicarbonate buffer was added to the 0.8 molar solution of hypochlorous acid thus obtained. Addition over a period of 1.5 hours of 1.4 moles of the methacrolein diethyl acetal while allowing the temperature to rise to about 30° C. gives an isomeric mixture of 1-chloro-2-hydroxy- and 2-chloro-1-hydroxypropionaldehyde diethyl acetals which are recovered by extraction with chloroform and distillation of the extract.

B. Production of the hydroxy acetal

The chloro-hydroxy acetals prepared as above are hydrolyzed with aqueous sodium hydroxide solution in a manner essentially as described in Example IIB to obtain the diethyl acetal of beta-methyl glycerol aldehyde; B.P. 114–116° C. (12 mm.).

C. Hydrolysis-hydrogenation reaction

Using the conditions of Example IC there is obtained beta-methyl glycerol, B.P. 115–120° C. at 1.6 mm., together with ethyl alcohol for recycling to the acetal formation step.

Reacting acrolein in the same way with glycerol monochlorohydrin using 0.056 mole percent of p-toluenesulfonic acid and refluxing for 1.5 hours while removing the water formed gives a 75% yield of 2-vinyl-4-chloromethyl-1,3-dioxolane, B.P. 60° C. (9 mm.), $n$ 20/D 1.4611, which on chlorohydrination by reaction with a suspension of calcium hypochlorite in water added in portions at about 8–10° C. with stirring until the solution no longer darkens starch-iodide paper, gives 2-(1-chloro-2-hydroxyethyl)-4-chloromethyl-1,3-dioxolane. Reaction of this acetal with 27% sodium hydroxide solution at 160° C. for about 6 hours gives a good yield of 2-(1,2-dihydroxyethyl)-4-hydroxymethyl-1,3-dioxolane; B.P. 70°–72° C. (2 mm.), $n$ 20/D 1.4647, hydroxyl value 0.76 equivalent per 100 grams, which by simultaneous hydrolysis and hydrogenation under the conditions of Example IIC gives glycerol with only a very small amount of higher boiling material as by-product.

EXAMPLE IV.—CONVERSION OF BETA-HYDROXYPROPIONALDEHYDE TO TRIMETHYLENE GLYCOL

A. Production of the acetal

An aqueous solution containing 21.4% of beta-hydroxypropionaldehyde in water, produced by stirring 2 moles of 96% acrolein with 328 grams of water and 10 grams of sulfuric acid at 50° C. for seven hours, was refluxed for two hours with 227 grams (1.9 moles) of 2-methyl-2,4-pentanediol and 250 ml. of benzene in the presence of the sulfuric acid. The layers were separated, the aqueous layer was extracted with benzene, the extract was added to the organic layer and the mixture was water washed, dried and distilled.

There was obtained 114 grams of 2-(2-hydroxyethyl)-4,4,6-trimethyl-1,4-dioxane, B.P. 74°–75° C. at 1.1 mm., $n$ 20/D 1.4473.

Simultaneous hydrolysis and hydrogenation of the cyclic acetal as in Example IC gives the same good yield of trimethylene glycol.

EXAMPLE V.—CONVERSION OF ALPHA-HYDROXYADIPALDEHYDE TO 1,2,6-TRIHYDROXYHEXANE

A. Production of the acetal

To a solution of about 0.5 mole of alpha-hydroxyadipaldehyde in water containing 0.5 gram of sulfuric acid was added 118 grams (1.0 mole) of 2-methyl-2,4-pentanediol in 150 ml. of benzene and the mixture was stirred under reflux for 1.5 hours. The layers were separated. The aqueous layer was washed with benzene and the combined benzene solutions were dried and filtered. The benzene solution was distilled under vacuum to remove the solvent and the residue distilled from a Claisen still. The forecut, B.P. 68°–71° C. (0.5 mm.), was 35 grams of 2-methyl-2,4-pentanediol (29% recovery). The product cut was 116 grams corresponding to 100% yield as the half acetal which boiled at 121° C. (0.8 mm.) after redistillation through a two-foot, helices-packed column, n 20/D 1.4632. Analysis for

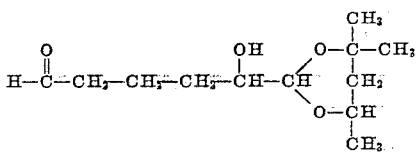

|  | Theory | Found |
|---|---|---|
| Carbon | 62.7 | 62.5 |
| Hydrogen | 9.7 | 9.7 |
| Hydroxyl Value (eq./100 g.) | 0.43 | 0.42 |

When freshly distilled this compound is a very viscous pale yellow oil which on standing becomes more fluid and colorless. Simultaneous hydrolysis and hydrogenation in 20% aqueous acetic acid solution at 100° C. with 1000 p.s.i.g. of hydrogen using 10% palladium on charcoal as catalyst gives 1,2,6-hexanetriol in good yield together with 2-methyl-2,4-pentanediol for recycling.

The acetal formation steps of Examples IV and V illustrate the way alpha, beta- and/or alpha, gamma-polyols having a tertiary carbinol group not more than once removed from a secondary or tertiary carbinol group can be used to remove, in the form of their cyclic acetals, hydroxy aldehydes from dilute aqueous solution without distilling off the water. This aspect of the invention is further illustrated by the following example showing the removal of formaldehyde from aqueous solution by formation of hexylene glycol acetal:

EXAMPLE VI

Five hundred grams of a 2.96% solution of formaldehyde was prepared by diluting 41 grams of 37% solution to 500 grams (0.5 mole) of formaldehyde. The acidity was adjusted to pH 3 with 0.8 gram of sulfuric acid, and the solution was stirred for two hours at 60° C. with 59 grams (0.5 mole) of 2-methyl-2,4-pentanediol (hexylene glycol) and 150 ml. of benzene. Titration then showed 2.47% formaldehyde in the aqueous phase. A second 59 gram portion of glycol was added. After four further hours at 60° C., the formaldehyde concentration in the aqueous phase was 1.64%. Two further similar treatments reduced the formaldehyde to 1.38 and 1.21% w. After separation, the aqueous layer was extracted three times with 150 ml. portions of benzene, leaving 1.02% formaldehyde in the aqueous layer. A single further treatment with 59 grams of diol in 100 ml. of benzene followed by three extractions with benzene lowered the formaldehyde concentration to 0.79%. Thus 74% of the formaldehyde was removed.

On fractionation of part of the extracts through a two-foot helices-packed column, 31 grams (65% yield, based on formaldehyde removed) of 4,4,6-trimethyl-1,3-dioxane was obtained. This is apparently a new compound.

|  | Theory (C₇H₁₄O₂) | Found |
|---|---|---|
| Boiling Point |  | 56° C. (31 mm.) |
| n 20/D |  | 1.4202 |
| Carbon | 64.6 | 64.3 |
| Hydrogen | 10.8 | 10.8 |

The use of this method of the invention to separate an aldehyde, as cyclic acetal, from a ketone is illustrated by the following example:

EXAMPLE VII.—SEPARATION OF ALDEHYDE FROM KETONE BY ACETAL FORMATION

A 500-ml. three-necked flask equipped with stirrer and phase-separating head was charged with 58 grams (1.04 moles) of acrolein, 58 grams (1.0 mole) of acetone, 114 grams (0.965 mole) of the hexylene glycol 2-methyl-2,4-pentanediol, 0.1 gram of p-toluenesulfonic acid, and 250 ml. of benzene. After 1.5 hours under reflux, 18.5 ml. of water was removed. A further 1.5 hours gave only 0.5 ml. of water. The solution was then stirred with 2 grams of calcium carbonate, filtered, and stripped. Bromine-water thiosulfate titration of the combined light ends showed a maximum of 4.5 grams of acrolein.

The product was distilled through a two-foot helices-packed column. After a small (3 ml.) forecut the product distilled in the range 65°–67° C. (20 mm.) n 20/D 1.4373. The corresponding constants for the acrolein-hexylene glycol acetal are 62°–64° C. (18 mm.), n 20/D 1.4381. The yield was 128 grams (85% conversion to product of hexylene glycol), and there was 12 grams of bottoms.

It will be understood that the foregoing examples are merely illustrative and that the present invention broadly comprises the reductive hydrolysis of acetals of hydroxy aldehydes, from whatever source, by reaction in an aqueous acid medium at elevated temperature in the presence of a hydrogenation catalyst and under a superatmospheric pressure of hydrogen. In this way there is produced a polyol which corresponds to said hydroxy aldehyde while regenerating the alcohol from which the acetal was derived.

As indicated, the invention is applicable to acetals of hydroxy aldehydes generally. Specific examples of such acetals other than those used in the examples, well adapted for use in the reaction, include glycol aldehyde dimethyl acetal giving ethylene glycol and methanol, alpha-hydroxybutyraldehyde diisopropyl acetal giving butylene glycol and isopropanol, beta-hydroxypropionaldehyde diethyl acetal giving trimethylene glycol and ethanol, alpha-methyl-beta-hydroxyvaleraldehyde diisobutyl acetal giving 2-methyl-1,3-pentanediol and isobutanol, 2-ethyl-3-hydroxyheptanal diamyl acetal giving 2-ethyl-1,3-dihydroxyhexane and normal amyl alcohol, 2-(2-hydroxyethyl)-4,4,5-trimethyl-1,3-dioxolane giving trimethylene glycol and 2-methyl-2,3-butanediol, 2-(1,2-dihydroxyethyl)-4-hydroxymethyl-1,3-dioxolane giving glycerol as the sole product, 2-(1-hydroxyisopropyl)-4-(omega-hydroxybutyl)-1,3-dioxolane giving isobutylene glycol and 1,2,6-hexanetriol, 2-(2-phenyl-1,2-dihydroxyethyl)-1,3-dioxane giving alpha-phenylglycerol and trimethylene glycol, 3,9-bis(2-hydroxyisobutyl)-2,4,8,10-tetraoxaspiro[5.5]hendecane.

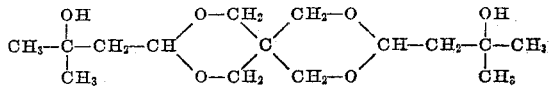

giving 3-methyl-1,3-dihydroxybutane and pentaerythritol, 2-(2-hydroxypropyl)-1,3-dioxolane giving butylene glycol and ethylene glycol, 2-(1-hydroxy-2,2-dimethylpropyl)-4,4,6,6-tetramethyl-1,3-dioxane giving 3,3-dimethyl-1,2-dihydroxybutane and 2,4-dimethyl-2,4-hexanediol, and 2,2,6 - trimethyl - 2 - hydroxyhexahydrobenzaldehyde dimethyl acetal giving 2,2,6-trimethyl-2-hydroxyhexahydrobenzyl alcohol and methanol. The reaction is of special advantage in the conversion of acetals of alpha- and/or beta-hydroxy aldehydes which because of their tendency to dehydrate and/or undergo other undesirable side reactions are very difficult to efficiently convert to the corresponding polyols having a carbinol group in place of the aldehyde carbonyl group. Acetals of hydroxy aldehydes having 3 to 9 carbon atoms per molecule and monohydric alcohols of 1 to 5 carbon atoms or polyols of 2 to 8 carbon atoms are especially preferred in the new reaction of the invention.

In addition to the specific ethylenic aldehydes mentioned in the examples as suitable starting materials for the combination process of the invention, other aliphatic and cycloaliphatic ethylenically unsaturated aldehydes can be used in the process in an analogous manner. Specific examples of such ethylenic aldehydes include tiglic aldehyde, beta-methylcrotonaldehyde, alpha-ethylacrolein, alpha,beta-dimethylcrotonaldehyde, 2-hexenal, citronellal, citral, alpha-chloroacrolein, tetrahydrobenzaldehydes, and alpha-cyclocitral, as well as aromatic aldehydes such as cinnamyl aldehyde. The preferred starting ethylenically unsaturated aldehydes are those having 3 to 12 carbon atoms per molecule which have an ethylenically unsaturated carbon atom not more than once removed from the carbonyl carbon atom and are free from reactive groups other than the ethylenic double bond and the carbonyl group.

As previously indicated, there are special advantages in using alpha,beta- and alpha,gamma-polyols for reaction with these ethylenically unsaturated aldehydes according to the invention. Specific polyols which are useful for this reaction include, in addition to those of the examples, 2,3-butanediol, 2-methyl-2,3-butanediol, pinacol, 2,4-dimethyl-2,4-butanediol, 3-methyl-5-ethyl-3,5-heptanediol, glycerol, 1,2,6-hexanetriol, sorbitol, glycerol monochlorohydrin, alpha-phenyl glycerol, 1,2-dihydroxycyclohexane, and 1-hydroxyhexahydrobenzyl alcohol. The preferred polyols are those having two carbinol groups which are separated by not more than one carbon atom and contain from 2 to 10 carbon atoms per molecule, particularly the compounds of this type having 5 to 10 carbon atoms and at least one tertiary carbinol group separated by not more than one carbon atom from a non-primary carbinol group. This preferred type of polyol is also of special advantage when employing hydroxy aldehydes for the reaction instead of the ethylenic aldehydes. Examples of specific aldehydes which have been found to be especially useful for reaction with these polyols to form cyclic acetals are alpha-hydroxypropionaldehyde, beta-hydroxypropionaldehyde, glycerol aldehyde, 4-hydroxy-3-formyl-tetrahydropyran, and alpha-hydroxyadipaldehyde.

Many of the products obtained in the process are new compounds of the present invention, typical examples being 2-vinyl-4-(delta-hydroxybutyl)-1,3-dioxolane, boiling 95°–105° C. at 0.2 mm., $n$ 20/D 1.4641, from acrolein and 1,2,6-hexanetriol, 2-vinyl-4,4,6-trimethyl-1,3-dioxane, boiling 62°–64° C. at 18 mm., $n$ 20/D 1.4381, from acrolein and 2-methyl-2,4-pentanediol, 2-vinyl-1,3-dioxane, boiling 65°–66° C. at 44 mm., $n$ 20/D 1.4438, from acrolein and trimethylene glycol, triallylidene sorbitol, boiling 149°–151° C. at 0.9 mm., $n$ 20/D 1.4865, bromine No. 158, having the structure

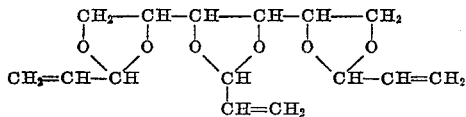

and dicrotonylidene pentaerythritol, boiling 130°–132° C. at 0.5 mm., M.P. 50°–52° C., bromine No. 131. In addition to their use as intermediates in the conversion of acrolein to polyols according to the invention these new compounds are also advantageous in the preparation of other derivatives. Those having a plurality of vinyl groups in particular form useful resinous materials by copolymerization with other polymerizable ethylenic compounds such as vinyl chloride, butadiene, etc. The monoethylenic compounds can be reacted with conjugated diolefinic compounds such as butadiene to form Diels-Alder adducts or with aldehydes to produce acetals of gamma-keto aldehydes. Still other useful products can be produced from these new compounds.

It will thus be seen that many apparently widely different embodiments of this invention can be made without departing from the scope and spirit thereof, and it will be understood that the invention is not limited to the specific embodiments which have been given by way of illustration, but only as defined in the appended claims.

We claim as our invention:

1. A method for converting an ethylenic aldehyde into a polyol having the same structure as said aldehyde but having a carbinol group in place of the carbonyl group and containing a hydroxyl group linked to at least one of the carbon atoms of the ethylenic group of said starting ethylenic aldehyde, which comprises reacting said ethylenic aldehyde with an alcohol to effect linkage of two hydroxyl groups thereof to said carbonyl group and subjecting the resulting acetal to reaction with a hydrating agent whereby the ethylenic double bond is saturated and at least one hydroxyl group is joined to a carbon atom thereof, and subjecting the hydroxy product to reaction with hydrogen under superatmospheric pressure in the presence of a hydrogenation catalyst and an aqueous acidic hydrolytic medium containing from 1 to 100 moles of water per mole of acetal at elevated temperature, recycling the product alcohol, and recovering a polyol having the same structure as said aldehyde but having a carbinol group in place of the carbonyl group and containing a hydroxyl group linked to at least one of the carbon atoms of the ethylenic group of said starting ethylenic aldehyde.

2. A process for producing a triol in accordance with claim 1 wherein an ethylenic aldehyde is reacted with a polyol to form an ethylenic cyclic acetal and said acetal is reacted with hydrogen peroxide in the presence of a hydroxylating catalyst to obtain a cyclic acetal of a dihydroxy aldehyde which is subjected to simultaneous hydrolysis and hydrogenation.

3. A process for converting an alpha,beta-ethylenic aldehyde to a saturated polyol which comprises reacting said aldehyde, a saturated polyhydroxy alcohol and a hydrogen halide at about −20° C. to +25° C. to form the cyclic acetal of said polyhydroxy alcohol and a beta-halo-substituted saturated aldehyde, hydrolyzing said beta-halo cyclic aldehyde by reaction with an aqueous base to produce the corresponding beta-hydroxy cyclic acetal and reacting said hydroxy cyclic acetal with hydrogen under superatmospheric pressure in the presence of a hydrogenation catalyst and an aqueous acidic hydrolytic medium containing from 1 to 100 moles of water per mole of acetal at elevated temperature, recycling the product saturated polyhydroxy alcohol, and recovering a saturated polyol having the same structure as said alpha,beta-ethylenic aldehyde but having a carbinol group in place of the carbonyl group and containing a hydroxyl group linked to at least one of the carbon atoms of the ethylenic group of said alpha,beta-ethylenic aldehyde.

4. A process in accordance with claim 3 wherein acrolein is converted to trimethylene glycol by reaction with hydrogen chloride and a diol having at least one tertiary carbinol group and another carbinol group not more than once removed therefrom which is linked to at least two carbon atoms and the resulting cyclic acetal of beta-chloropropionaldehyde is hydrolyzed and the product is hydrogenated in the presence of an aqueous acetic acid solution containing from 1 to 100 moles of water per mole of acetal, and a Raney nickel hydrogenation catalyst, recycling the product diol having at least one tertiary carbinol group and another carbinol group not more than once removed therefrom which is linked to at least two carbon atoms, and recovering trimethylene glycol.

5. A process for producing glycerol which comprises reacting acrolein with 2-methyl-2,4-pentanediol in the presence of 0.002 to 0.007 mole percent of toluene sulfonic acid based upon the amount of acrolein used at 60° to 100° C. for not more than 3 hours, hydroxylating the resulting acrolein acetal and subjecting the product to simultaneous hydrolysis and hydrogenation by reaction with hydrogen under pressure of at least 250 p.s.i.g. in the presence of aqueous acetic acid solution containing from 1 to 100 moles of water per mole of acetal, and a hydrogenation catalyst at 50° C. to 300° C., recycling the product 2-methyl-2,4-pentanediol, and recovering glycerol.

6. The process of claim 1, wherein the alcohol with which the ethylenic aldehyde is reacted is selected from the group consisting of alpha, beta-dihydroxy and alpha, gamma-dihydroxy polyols.

7. A method for converting an ethylenic aldehyde into a polyol having the same structure as said aldehyde but having a carbinol group in place of the carbonyl group and containing a hydroxyl group linked to at least one of the carbon atoms of the ethylenic group of said starting ethylenic aldehyde, which comprises reacting said aldehyde with a polyol having at least two carbinol groups, at least one of which is a tertiary carbinol group, separated by not more than one carbon atom in the presence of 0.02 to 0.06 mole percent of a sulfo acid at a temperature of about 50° to 90° C. to form the unsaturated cyclic acetal, reacting the unsaturated cyclic acetal with a hydroxylating agent to place a hydroxyl group on at least one carbon atom of the ethylenic group of the acetal, reacting the cyclic acetal with hydrogen under superatmospheric pressure in the presence of a hydrogenation catalyst and an aqueous acidic hydrolytic medium containing from 1 to 100 moles of water per mole of acetal, recycling the product polyol having at least two carbinol groups separated by not more than one carbon atom, and recovering a polyol having the same structure as said aldehyde but having a carbinol group in place of the carbonyl group and containing a hydroxyl group linked to at least one of the carbon atoms of the ethylenic group of said starting aldehyde.

8. A method for converting an ethylenic aldehyde into a polyol having the same structure as said aldehyde but having a carbinol group in place of the carbonyl group and containing a hydroxyl group linked to at least one of the carbon atoms of the ethylenic group of said starting ethylenic aldehyde, which comprises reacting said aldehyde with a saturated polyol having at least two carbinol groups, at least one of which is a tertiary carbinol group, separated by not more than one carbon atom under anhydrous conditions in the presence of no more than 1.1 moles of hydrogen halide per mole of aldehyde to form the cyclic acetal of a hydrochlorinated aldehyde, hydrolyzing said acetal in aqueous medium at a pH from about 7.5 to 10 at an elevated temperature, and reacting the resulting cyclic acetal with hydrogen under superatmospheric pressure and in the presence of a hydrogenation catalyst and an aqueous hydrolytic medium containing from 1 to 100 moles of water per mole of acetal, recycling the product polyol having at least two carbinol groups separated by not more than one carbon atom, and recovering a polyol having the same structure as said aldehyde but having a carbinol group in place of the carbonyl group and containing a hydroxyl group linked to at least one of the carbon atoms of the ethylenic group of said starting aldehyde.

9. A method for converting an ethylenic aldehyde into a polyol having the same structure as said aldehyde but having a carbinol group in place of the carbonyl group and containing a hydroxyl group linked to at least one of the carbon atoms of the ethylenic group of said starting aldehyde, which comprises reacting said aldehyde with a saturated polyol having at least two carbinol groups, at least one of which is a tertiary carbinol group, separated by not more than one carbon atom in an aqueous medium and in the presence of hypochlorous acid to form a cyclic acetal of a hydrochlorinated aldehyde, hydrolyzing said acetal in aqueous medium at a pH from about 7.5 to 10 at a temperature of about 150° to 200° C., and reacting the resulting cyclic acetal with hydrogen under superatmospheric pressure and in the presence of a hydrogenation catalyst and an aqueous hydrolytic medium containing from 1 to 100 moles of water per mole of acetal, recycling the product polyol having at least two carbinol groups separated by not more than one carbon atom, and recovering a polyol having the same structure as said aldehyde but having a carbinol group in place of the carbonyl group and containing a hydroxyl group linked to at least one of the carbon atoms of the ethylenic group of the starting aldehyde.

References Cited in the file of this patent

UNITED STATES PATENTS

| | | |
|---|---|---|
| 1,934,309 | Hoover | Nov. 7, 1933 |
| 2,143,370 | Fitzky | Jan. 10, 1939 |
| 2,367,324 | Arundale | Jan. 16, 1945 |
| 2,432,601 | Wiley | Dec. 16, 1947 |
| 2,486,024 | Hearne et al. | Oct. 25, 1949 |
| 2,598,040 | Dermer et al. | May 27, 1952 |
| 2,700,685 | Cooper et al. | Jan. 25, 1955 |
| 2,729,650 | Habeshaw et al. | Jan. 3, 1956 |

FOREIGN PATENTS

| | | |
|---|---|---|
| 682,260 | Great Britain | Nov. 5, 1952 |
| 860,347 | Germany | Dec. 22, 1952 |
| 903,857 | France | Feb. 5, 1945 |

OTHER REFERENCES

Hill et al.: J.A.C.S., vol. 51, pp. 1509–14 (1929).

Hibbert et al.: Ibid., pp. 3115–23 (1929).

Bergmann et al.: Berichte d.d.c. Ges., vol. 62, pp. 1467–74 (1929).

Weygand: "Organic Preparation," Interscience, N.Y., 1945, pp. 154–5.

Royals: "Advanced Organic Chemistry," Prentice-Hall, Englewood Cliffs, N.J., 1954; pages 631–7.